Figure 2:
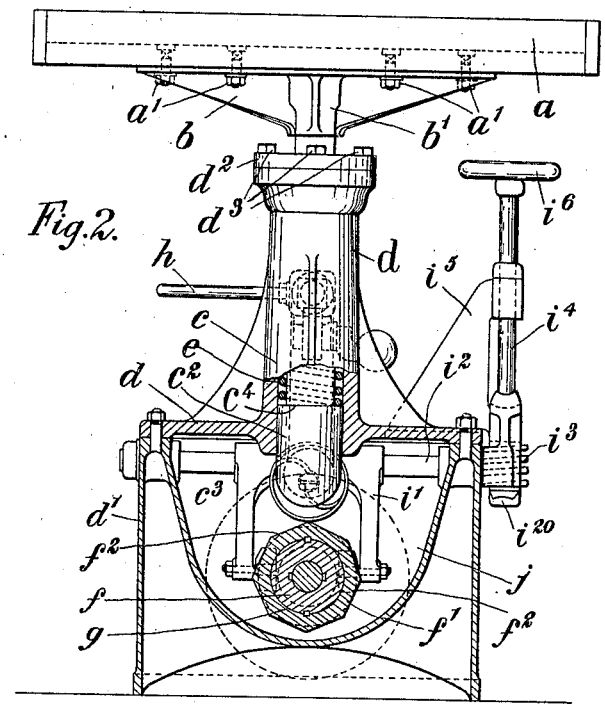

G. R. BAKER.
MACHINE FOR USE IN THE MANUFACTURE OF CONFECTIONERY.
APPLICATION FILED MAY 17, 1922.
1,437,880.
Patented Dec. 5, 1922.
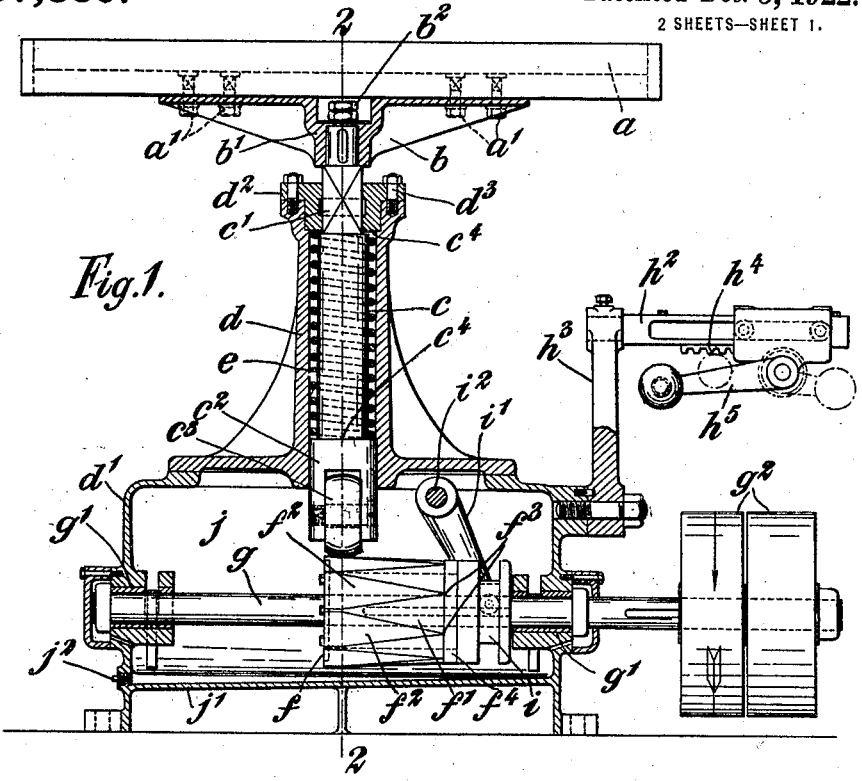
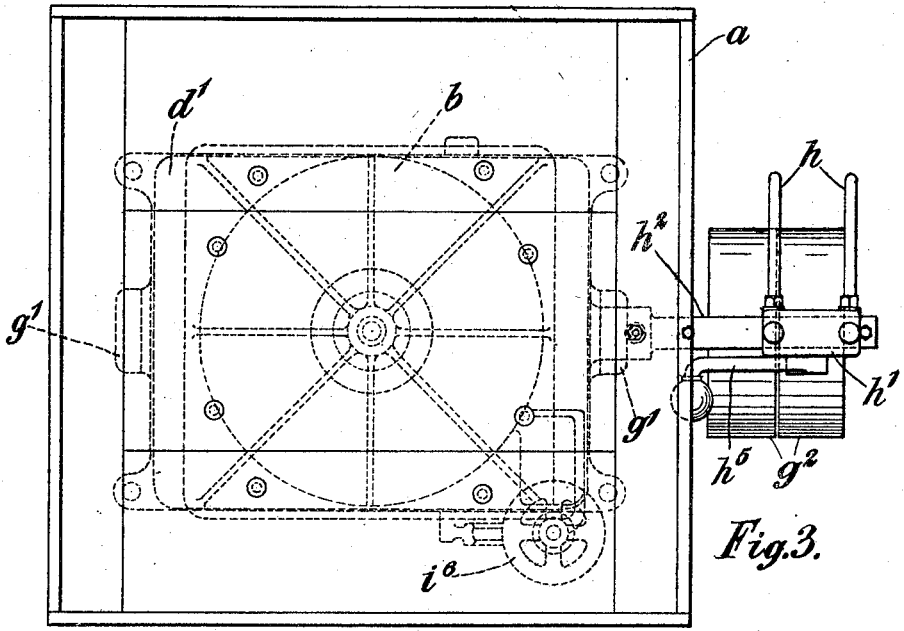
Inventor
George Ralph Baker Patented Dec. 5, 1922.

1,437,880

UNITED STATES PATENT OFFICE.

GEORGE RALPH BAKER, OF LONDON, ENGLAND, ASSIGNOR TO JOSEPH BAKER SONS AND PERKINS COMPANY, INCORPORATED, OF WHITE PLAINS, NEW YORK.

MACHINE FOR USE IN THE MANUFACTURE OF CONFECTIONERY.

Application filed May 17, 1922. Serial No. 561,713.

*To all whom it may concern:*

Be it known that I, GEORGE RALPH BAKER, residing at London, England, a subject of the King of Great Britain and Ireland, have invented certain new and useful Improvements in or Relating to Machines for Use in the Manufacture of Confectionery (for which I have filed application in England Mar. 11, 1921, No. 7,806), of which the following is a specification.

This invention relates to machines for use in the manufacture of confectionery and comprises improved means for imparting variable vibratory motion to a tapping table or equivalent on which moulds or the like containing chocolate or other plastic substance in a semi-fluid condition are subject to what is known as a "tapping" action to compact the substance in the moulds.

It has been previously proposed to impart variable vibratory movements to tables and other articles by means of sliding cams of varying contour at different parts and by means of non-sliding rotary cams having toothed or ratchet surfaces of different pitch, such cams acting on the table or the like directly or through an intermediate member.

According to the present invention however there is provided a cam member having a polygonal active surface, the faces of which are of greater angularity at one end than at the other, said cam member being mounted for sliding movement on a driving shaft having only rotary movement to bring different portions of the surface of said cam member into co-operation with the table or with an intermediate transmitting member which is always in contact with said cam surface and is not subjected to sudden drops as with the ratchet or toothed device and some of the cam devices hitherto known.

At the end of the cam member where the angular faces are least pronounced there may be provided additional intermediate angular faces so that at this part where the vibratory action is reduced it may be multiplied or become more rapid than at the opposite end where the amplitude of movement is increased or greater.

The invention also comprises the mounting of the cam member in a housing which is adapted to receive lubricant for lubricating the cam and associated parts.

The element for transferring the vibratory motion to the table may be in the form of a rod mounted in a column or standard having at its lower end a roller bearing on the cam surface and always maintained in contact therewith by a spring coiled about the rod. The upper end of the latter is squared where it passes through a cap at the upper end of the column to prevent turning and is then rigidly connected to the underside of the table by a suitable bracket, coupling-plate or equivalent.

A practical embodiment of the invention is illustrated in the accompanying drawings in which:—

Fig. 1 is a vertical sectional elevation showing a tapping table and mechanism for imparting the vibratory motion thereto; Fig. 2 is a sectional elevation taken on the line 2—2 of Fig. 1 and Fig. 3 is a plan view.

In said drawings $a$ designates the table, which is shown as connected by bolts $a^1$ to a bracket or plate $b$ having a central boss $b^1$ through which extends a bolt $b^2$ by which the bracket and consequently the table are connected to the upper squared end $c^1$ of a vertical rod $c$. The latter is mounted in a hollow column or standard $d$ forming the upper part of a base or housing $d^1$ in which the cam mechanism hereinafter described is enclosed. The said squared end of the rod passes through a cap $d^2$ bolted at $d^3$ to the upper end of the column $d$ to prevent axial turning of the rod and the lower end of the latter is provided with a fork $c^2$ in which is rotatably mounted a roller $c^3$.

Between the shoulders $c^4$ formed by the cap $d^2$ and fork $c^2$ is a helical spring $e$ coiled about the rod $c$ and which forces the roller $c^3$ to remain in constant contact with the cam-member $f$ which is mounted to slide as by means of a spline $f^1$ on the driving shaft $g$ mounted in bearings $g^1$ at opposite sides of the housing $d^1$.

As will be clearly seen from Figs. 1 and 2 the said cam-member has an octagonal peripheral surface, the faces $f^2$ of which are of greater angularity at one end than the other; in the form shown these angular faces tail off to a point at $f^3$ and the remainder of the member is of circular contour as at $f^4$.

At this end of the cam member there is shown a collar $i$ with which co-operates a fork or double-armed lever $i^1$ carried by a shaft $i^2$ having bearing in the walls of the housing, and exteriorly of the latter carrying a worm wheel or segment $i^{20}$ with which meshes a worm $i^3$ carried by a vertical spindle $i^4$ mounted in a bracket $i^5$ extending from the upper part of the housing and carrying at its upper end a hand-wheel $i^6$. By this mechanism the cam-member $f$ can be shifted longitudinally on the driving shaft $g$ in order that different parts of the angular faces $f^2$ may act on the roller $c^3$ and thus impart varying amounts of vibratory motion to the rod $c$ and thus to the table, the roller always being maintained in contact with the cam member by the spring $e$. The housing $d^1$ is preferably of the interior cross-section shown in Fig. 2 in order to form a chamber $j$ for the reception of lubricant for the cam-member and associated parts, the base $j^1$ of the chamber being inclined as in Fig. 1 and provided with a draining aperture normally closed by a plug $j^2$.

The driving shaft $g$ is shown as provided with fast and loose belt pulleys $g^2$, means being shown for shifting the belt comprising the shift-fork $h$ carried by a head $h^1$ mounted to slide on a bracket $h^2$ carried by an arm $h^3$ supported from the housing $d^1$, the sliding movement of the head being effected by rack and pinion gear $h^4$ and a counter-weighted lever $h^5$.

What I claim as my invention and desire to secure by Letters Patent of the United States is:—

1. In a machine for use in the manufacture of confectionery the combination of a "tapping" table, a cam member cooperating therewith having a polygonal active surface, the faces of which are of greater angularity at one end than the other and means for moving said cam member to bring different portions of its surface into cooperation with the table to impart variable vibratory motions thereto.

2. In a machine for use in the manufacture of confectionery the combination of a tapping table, a cam member co-operating therewith having a polygonal active surface, the faces of which are of greater angularity at one end than the other end, a rotary driving shaft on which said cam member is slidably mounted and means for sliding the cam member on the shaft to bring different portions of its cam surface into co-operation with the table to impart variable vibratory movements thereto.

3. In a machine for use in the manufacture of confectionery the combination of a "tapping" table, a cam member cooperating therewith having a polygonal active surface, the faces of which are of greater angularity at one end than the other a motion transmitting element between the table and the cam member, means for always maintaining said element in contact with the cam member, and means for moving the latter to bring different portions of its surface into cooperation with said transmitting element to impart variable vibratory movements to the table.

4. In a machine for use in the manufacture of confectionery the combination of a tapping table, a vertical rod supporting same, a column enclosing said rod and formed at its base as a hollow chamber, a cam member housed in said chamber and having a polygonal active surface the faces of which are of greater angularity at one end than the other, said surface cooperating with the rod, spring means for maintaining constant contact between the rod and cam surface, a rotary driving shaft on which the cam is slidably mounted and means for sliding the cam to bring different portions of its surface into cooperation with the rod, the housing chamber aforesaid being adapted to receive lubricant for lubricating the cam member and associated parts.

In witness whereof I have signed this specification.

GEORGE RALPH BAKER.